O. KRAUS.
POWER PLANT.
APPLICATION FILED MAR. 19, 1918.

1,392,947. Patented Oct. 11, 1921.
6 SHEETS—SHEET 3.

Inventor
Otto Kraus
By his Attorney
James Hamilton

UNITED STATES PATENT OFFICE.

OTTO KRAUS, OF NEW YORK, N. Y., ASSIGNOR TO KRAUS ENGINE COMPANY, OF NEW YORK, N. Y., A CORPORATION OF NEW YORK.

POWER PLANT.

1,392,947.   Specification of Letters Patent.   Patented Oct. 11, 1921.

Application filed March 19, 1918. Serial No. 223,264.

*To all whom it may concern:*

Be it known that I, OTTO KRAUS, a citizen of the United States of America, residing at the borough of Manhattan, in the city, county, and State of New York, have invented certain new and useful Improvements in Power Plants, of which the following is a specification, reference being had to the accompanying drawings.

This invention relates to improvements in apparatus for the production and utilization of working fluids; and an object of this invention is to provide an apparatus of the character just mentioned which will be simple in construction, comparatively cheap in manufacture, and efficient and durable in operation and use and the cost of maintaining which in a state of good repair will be low as compared with apparatus of this kind heretofore put upon the market. The features of this invention will become apparent as the following description proceeds.

In the drawings illustrating the principle of this invention and the best mode now known to me of applying that principle.

Figures 1, 2, 3, 4, 5, 6, 7:
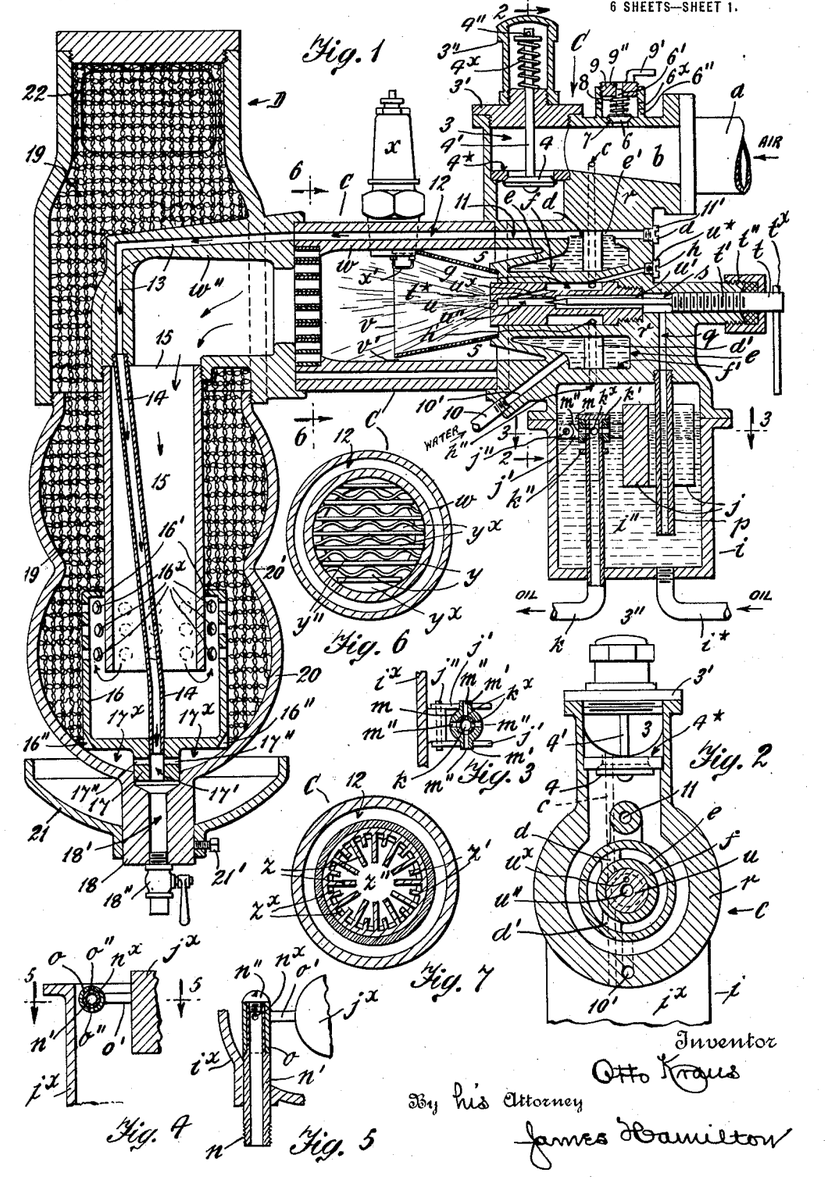
Figure 1 is a vertical, central section through the furnace, fuel-supply tank or reservoir and steam-generator.
Fig. 2 is a transverse, vertical section on the line 2—2 of Fig. 1.
Fig. 3 is a fragmentary section on the line 3—3 of Fig. 1 and illustrates one form of valve mechanism for controlling the overflow of oil from the oil reservoir.
Fig. 4 is a fragmentary sectional view of a modified form of valve mechanism for controlling the overflow of oil from the oil-reservoir.
Fig. 5 is a section on the line 5—5 of Fig. 4.
Fig. 6 is a section on the line 6—6 of Fig. 1 and illustrates one form of a flame-maintaining or re-ignition grating.
Fig. 7 as a vertical sectional view showing a modified form of a flame-maintaining or re-ignition grating.
Figures 8, 9:
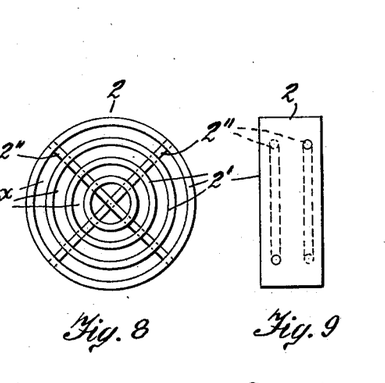
Figs. 8 and 9 are, respectively, a front elevation and a side view of another modified form of a flame-maintaining or re-ignition grating.

The compressed air flows from the air-compressor A (Fig. 14), through the pipe *a* (Fig. 1) to the chamber *b*, a wall of which is formed with an air-passage *c* the inner, lower end of which communicates with the outer end of an air-conduit *d* that passes transversely through the annular water-chamber *e*. The inner cylindrical wall *f* of the latter surrounds an air-chamber *g* and is pierced with a pair of air-openings *h*, *h'*, through the upper one (*h*) of which flows the air from the conduit *d* into the chamber *g* and thence through the lower one (*h'*) into the lower air-conduit *d'*, which traverses the annular water-chamber *e* and discharges, through an air-hole *h''* formed in the top wall *f'* of the oil-reservoir *i*, into the air-space *i'* therein above the surface of the liquid fuel (oil or like hydrocarbon) *i''*, which is thus subjected to the pressure of the air from the air-compressor A. Within the fuel-reservoir $i$, there is supported, by the buoyant effort of the liquid hydrocarbon $i''$, a float $j$ from which extends a pair of arms $j'$ that are connected, by a pivot-pin $j''$, to the lateral wall $i^x$ of the fuel-reservoir $i$ (Figs. 1 and 3). Through the bottom of the fuel-reservoir $i$, there passes an oil-overflow pipe $k$, the inner upper end of which is closed, except for the perforations $K^x$, hereinafter referred to, and is formed with a laterally-extending, annular flange $K'$, below which there is formed, on the pipe $k$, a collar $k''$. Between the latter and the flange $k'$, the pipe $k$ is formed with a circular series of perforations $k^x$; and there is mounted, on this part of the pipe $k$, a sleeve-valve $m$ formed with a laterally-projecting pair of ears $m'$, against which there press upwardly the float-operated arms $j'$. The sleeve-valve $m$ is further formed with a series of oil-ports $m''$ which, when the valve is raised to the upper limit of its travel (determined by the annular flange $k'$) by means of the float-operated arms $j'$, come into register with the holes $k^x$ (Figs. 1 and 3), whereupon oil flows from the oil-reservoir $i$, through the oil-ports $m''$ and holes $k^x$, into the oil-overflow pipe $k$ and therethrough to the source of supply of the oil. By this arrangement of parts, the liquid fuel $i''$ is maintained at a constant level in the reservoir $i$. It is to be noted that the oil-ports $m''$ do not register with the perforations $k^x$, until the level of the oil lies at a substantial distance above the closed inner end of the pipe $k$, whereby escape of the compressed air therethrough is avoided. A modified form of the overflow-valve arrangement just described is illustrated in Figs. 4 and 5, wherein there is shown, rotatably mounted on the inner end of the horizontally-disposed part $n'$ of the oil-overflow pipe $n$, a sleeve-valve $o$ that is connected, to the float $j^x$, by means of the arm $o'$ and that is held in place, on the pipe $n$, by means of a screw $n''$. The inner end of the pipe $n$ is formed with the holes $n^x$ with which are arranged to register, when the float $j^x$ has reached the permissibly highest point of its travel, with the ports $o''$ formed in one end of the sleeve-valve $o$. Liquid fuel $i''$ is forced (as by a pump, not shown) through a fuel-feed pipe $i^*$, to the fuel-reservoir $i$ and flows therefrom through the oil-pipe $p$, which discharges, at its upper end, into an oil-passage $q$ that is formed in the front wall $r$ of the furnace C and the upper outlet end of which communicates with the valve-chamber $s$ of the needle-valve $t$, the body-portion $t'$ of which is screw-threaded and projects through a stuffing-box $t''$ and is provided with a handle $t^x$, by turning which the valve $t$ may be turned and thereby moved toward and from its seat $t^*$ whereby the amount of oil allowed to flow past the point of the needle-valve $t$ may be closely regulated. In the wall of the air-chamber $g$ there is screwed an atomizer-plug $u$ the central passage $u'$ in which forms an extension of the valve-chamber $s$ and is adapted to receive the needle valve $t$. The inner end $u''$ of the central passage $u'$ serves as an outlet passage for the oil that passes the valve-seat $t^*$. In the wall of the atomizer-plug $u$, there is formed an inclined air-passage $u^x$, by means of which communication is established between the air-chamber $g$ and the oil-outlet passage $u''$. When the compressed air, rushing from the air-chamber $g$ through the air-passage $u^x$, meets the oil in the discharge passage $u''$ of the atomizer-plug $u$, it carries the oil along with it and breaks the oil into a fine spray, as will be readily understood by all persons skilled in this art. The mixture of air sprayed oil that issues from the atomizer $u$ is thick or dense, since the relative proportions are so regulated that the mixture contains a comparatively large amount of oil; and this relatively "fat" mixture, which is readily ignitible, flows into a trumpet-shaped mouthpiece $v$, which, at its larger end, is separated, by a narrow interval or space $v'$ (Fig. 1), from the inner wall of the combustion-chamber $w$, except at the top thereof, where the mouth piece $v$ lies in close contact with the wall. At this point, there is arranged an electric ignition device $x$, the filament $x'$ of which may, by the passage of an electric current therethrough, be brought to a temperature sufficiently high to ignite the combustible mixture flowing through the mouthpiece $v$. Beyond the igniter $x$, there is arranged, in the combustion chamber $w$, a flame-maintaining contrivance of which there may be many forms; and there are illustrated herein three different forms (Figs. 6, 7 and 8). In the form shown in Fig. 6, the contrivance consists of a grating $y$ made up of a series of straight bars $y'$ that are held spaced apart by bars $y''$ of serpentine or wavelike form. The burning oil passes through the openings $y^x$ in the grating $y$ and raises the same to a high temperature, so that its great heat serves to maintain the flame at all times. In Fig. 7, there is shown a modified form of a flame-supporting device provided with a circular series of bars $z$ that project radially inward and between each pair of which there is a shorter bar $z'$ that likewise extends inward in a radial direction. The stream of hot gases flows through the graving thus formed and passes through the central opening $z''$ and the spaces $z^x$ between the bars $z$ and $z'$, whereby the same are raised to a high temperature and give off heat to the stream of gases, if the temperature of the latter should, at any instant, fall below that of these bars. Fig. 8 illustrates in front elevation and Fig. 9 in side elevation a second modified form of this flame-maintaining grating. In the case illustrated, the grating 2 is made up of a series of short cylinders 2' held together by means of diametrically-lying binder-bars 2", which run at right angles to each other and one of which is disposed in front of the other. The burning gases traverse the spaces 2ˣ between the concentric rings 2', which store up heat and later give off the same, whenever the temperature of the gases tends to fall substantially below that of the grating 2. Thus there is brought about a constant interchange of heat energy between the flowing hot gases and the grating.

Air flows, under pressure, from the chamber b into the valve-chamber 3 and thence past the valve 4 (Figs. 1 and 2) into the space 5 just in front of the mouthpiece v, from which space 5 the air escapes, through the interval v' between the discharge end of the mouthpiece v and the wall of the combustion chamber w. Since the latter wall and the mouthpiece v are in contact at the top of the combustion chamber w, no air can flow out at this point and thus is prevented the dilution of the mixture of oil-spray and air to such an extent as would make uncertain the ignition of the mixture by the electric device x. The air flowing through the interval v' serves to drive the mixture just mentioned toward the ignition device x and thereby tends to insure its being lighted or fired. Moreover, the escaping air, mingling with the mixture flowing from the mouthpiece v into the combustion chamber w, continues the support of the combustion of the oil spray in the mixture. The valve-chamber 3 is closed, at its top, by a screw-cap 3', through which passes the stem 4' of the valve 4, which stem is formed with a head 4". Between the latter and the screw-cap 3', there is interposed a helical spring 4ˣ, by means of which the valve 4 is held against its valve-seat 4*. The spring 4ˣ and the upper end of the valve-stem 4' are incased in a housing 3" that is screwed upon the screw-cap 3'. It is obvious that the valve 4 is pressed against its seat 4* by a force equal at least to the upward pull of the helical spring 4ˣ; and it follows that the pressure of the air coming from the chamber b into the valve-chamber 3, must overcome the tension of the spring 4ˣ sufficiently to open the valve 4, before any air can flow from the valve-chamber 3 to the combustion chamber w. It is clear, therefore, that, when the air pressure is sufficient to open the valve 4, against the tension of the spring 4ˣ, (which tension may be suitably regulated), the air will likewise have sufficient tension to break up the oil issuing from the atomizer u into a suitably fine spray and to exert a suitable pressure upon the surface of the oil i" in the reservoir i. In order to prevent the air in the chamber b from attaining too high a pressure, there is provided a relief-valve 6 which is held upon its seat 7 by the pressure of a helical spring 8 interposed between the valve 6 and a screw-cap 9 provided with a handle 9', by means of which the screw-cap 9 may be turned so as to vary the tension of the helical spring 8. The screw-cap 9 is formed with a guide-passage 9", in which is slidably fitted the upper end of the stem 6' of the valve 6. The casing 6" is formed with suitable ports 6ˣ for the escape of any air that may force its way past the valve 6.

Figure 13:
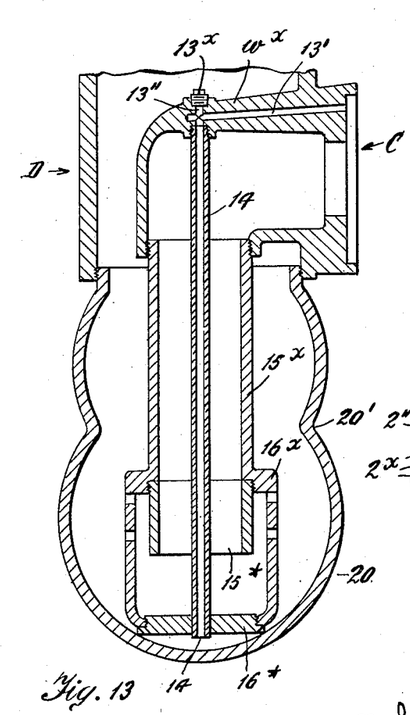
Fig. 13 is a fragmentary sectional view illustrating a modified form of flue and its connection with the rear end of the combustion chamber.
Figure 15:
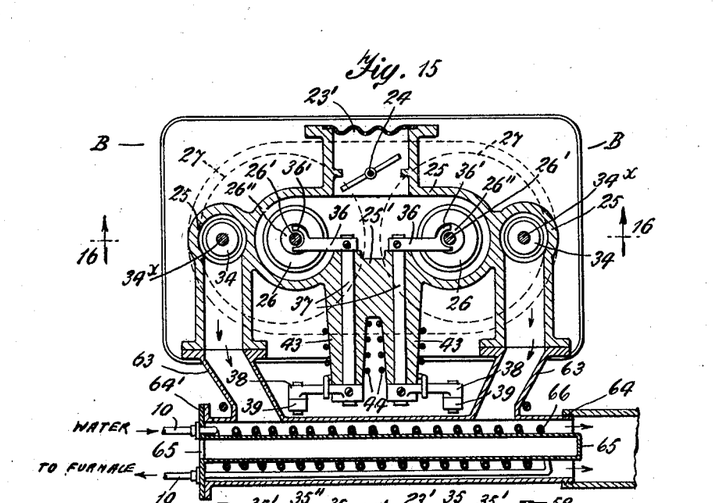
Fig. 15 is a section on the line 15—15 of Fig. 14.

Water is led, under pressure, by the water-pipe 10 (Figs. 1 and 15), from any suitable source of water-supply (e. g., a force-pump, not shown) to a water-passage 10' formed in the bottom part of the front wall r of the furnace C. The inner end of the water-passage 10' communicates with the water-chamber e, which serves as a water-jacket for the atomizer u and keeps the latter cool. The water-jacket e communicates (e. g., through its top e') with a water-passage 11 that is formed in the front wall r of the furnace C below the chamber b (Fig. 1) and the inner end of which communicates with a water-jacket 12 that surrounds the combustion chamber w. The wall w" of the rear part of the furnace C is formed with an L-shaped water-passage 13, one end of which communicates with the water-jacket 12 and in the other end of which there is fitted the upper end of a substantially upright water-pipe 14 that is mounted in a vertically-disposed flue 15, through which the burning oil and gases pass downwardly from the combustion chamber w and from which they are discharged into a box or drum 16, through an opening 16' formed in the top of which the lower end of the flue 15 projects or extends. From the bottom of the drum 16, there projects downwardly a nipple 17 that is seated in the upper end of a tubular boss or neck 18 and is formed with a lengthwise-extending central passage 17', in the top of which is fitted the lower end of the water-pipe 14. The passage 17' communicates with the central passage 18' that runs lengthwise through the tubular boss 18 projecting downwardly from the bottom of the steam-generator D. The outlet end of the passage 18' is closed by means of a drainage cock 18", which may be opened for the purpose of draining off water from the steam-generator D. In the nipple 17, there are formed laterally-extending outlet passages 17" through which the preheated water discharged from the water-pipe 14 flows into the space 17ˣ below the bottom of the drum 16, which is mounted in the lower end of the steam-generator D; and, as its level rises, the preheated water can escape from the space 17ˣ through the recesses 16" formed in the bottom edge of the drum 16. In the lateral wall of the drum 16, near the top thereof and above the mouth of the flue 15, there are formed outlets or ports 16ˣ through which flow the products of combustion discharged from the flue or conduit 15. These products of combustion are, of course, at a high temperature; and they serve to heat the drum 16 with which they contact; and at least part of any water that may be in the space immediately surrounding the drum 16 will be converted into steam by the heat transmitted to the water from the gases. Furthermore, the stream of gases moves with considerable velocity in flowing through the ports 16ˣ and tends to carry along with it some of the water from the drum 16. In the latter, there are thrown chain-links 19, which serve to break up into a multitude of fine streams, the currents of steam, entrained moisture and products of combustion and to cause the same to intermingle with one another, whereby a transfer of heat from the combustion products to the steam and entrained moisture is made to take place and the latter are converted into superheated steam or steam gas. The lower half 20 of the casing of the generator D is, at its middle, constricted or narrowed, as is shown at 20′, Figs. 1 and 13, and the casing is formed with swells above and below the constricted part 20′, so that this part of the casing virtually is made up of two bulbous-shaped shells superimposed one on the other. As a result of thus shaping the casing 20, the ascending currents of steam, entrained moisture and combustion products are given, near the constriction 20′, an inward direction toward the center of the generator D, where the heat is the greatest; and should any water that may have collected on the casing wall above the constriction 20′ tend to run down toward the latter, it will be directed inwardly at the constriction 20′ and will there meet and will be carried along with the inwardly-directed currents just referred to, the velocity of which will be increased at the narrowed portion 20′ of their path. To the downwardly-extending neck or boss 18, there is fastened (as by the set-screw 21′) a starting cup 21 adapted to hold an inflammable liquid (such as alcohol), which is ignited at starting and the heat from the burning of which generates steam in the generator D in sufficient quantity to drive the engine B for a limited time, or until the apparatus can, in its normal operation, generate its own working fluid.

Figure 10:
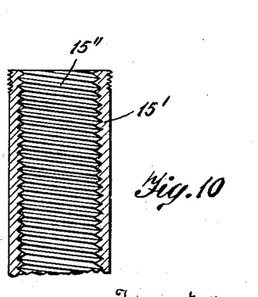
Fig. 10 is a fragmentary vertical section of a modified form of flue.
Figure 11:
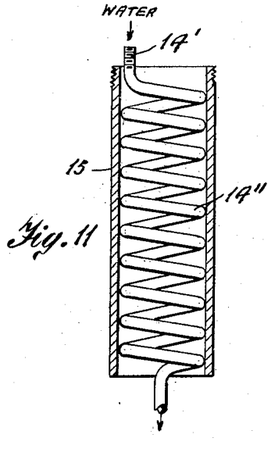
Figs. 11 and 12 illustrate, in vertical section, two different means for the introduction of water through the flue.
Figure 12:
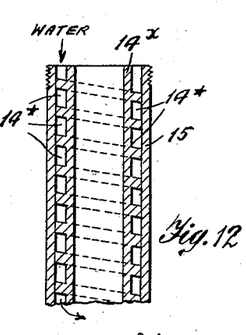

In Fig. 10, there is illustrated a modified form of flue or conduit 15′, the interior of which is formed with screw-threads 15″ the thin, sharp edges of which become highly heated, whereby any carbon deposit formed thereon is ultimately burned off. In Fig. 11, a modified form of water-pipe is shown; here the water-pipe 14′ is formed with a coil 14″ that exposes more heating surface to the combustion products than does the substantially straight water-pipe 14 of Fig. 1. In the modified construction illustrated in Fig. 12, the water-pipe 14 is omitted and the flue 15 is provided with a liner 14ˣ that is formed with an exterior helical groove 14* that serves as a channel through which the water flows from the L-shaped water-passage 13 in the rear wall $w''$ of the combustion chamber $w$ (Fig. 1) to the bottom of the steam-generator D. In the modified construction shown in Fig. 13, the vertical leg of the L-shaped water-passage 13 is dispensed with and the upper end of the water-pipe 14 communicates with the substantially horizontal water-passage 13′ formed in the rear wall $w^x$ of the combustion chamber. The lower part of the flue 15ˣ is formed integral with the top of the drum 16ˣ, the bottom of which is closed by a screw-plug 16* formed with a central hole to permit the passage of the lower end of the water-pipe 14. In the top of the drum 16ˣ, there is screwed a tubular member 15* that serves as an extension-piece for the flue 16ˣ. In order that it may withstand the high temperature of the combustion products, the flue-extension 15* is made of highly refractory material; and this member may be readily renewed from time to time, as occasion may require. To permit the cleaning of the water-pipe 14 the wall $w^x$ (Fig. 13) is formed with a hole 13″ that is in line with the bore of the water-pipe 14 and is normally kept closed by a screw-plug 13ˣ. Upon removing the latter, a suitable cleaning device (not shown) may be thrust into the bore of the tube 14 so as to free the same of any obstruction or foreign matter that may be therein. Similarly, upon removing the screw-plug 11′ (Fig. 1) in the outer or front end of the passage 11, a flexible tube-cleaner (not shown) may be thrust through the water-passage 11, water-jacket 12, L-shaped water-passage 13 and water-pipe 14 for the purpose of cleaning these passages. And, upon removing the screw-plug $u^*$ (Fig. 1), the air passage $u^x$ may be cleaned in an entirely similar manner and by like means.

Figure 14:
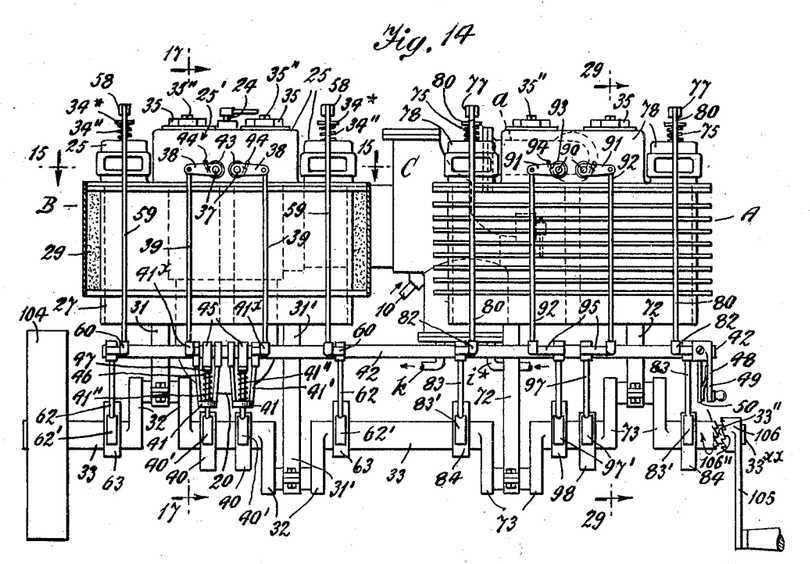
Fig. 14 is a front elevation of the engine and air-compressor.
Figures 16, 23:
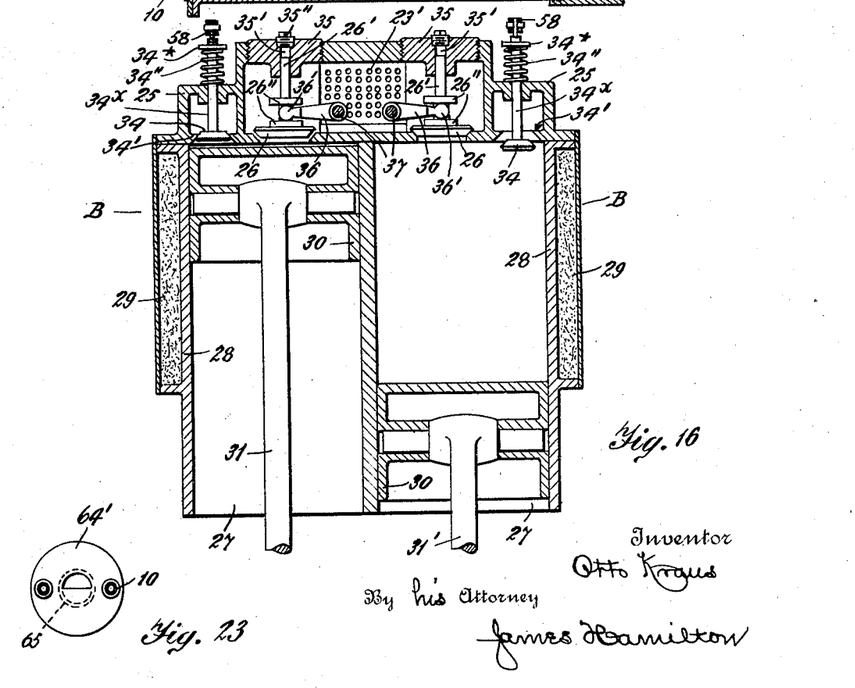
Fig. 16 is a section on the line 16—16 of Fig. 15.
Fig. 23 is an end view of the contrivance by means of which the water is preheated by the exhaust gases, which contrivance is shown in section in Fig. 15.
Figure 17:
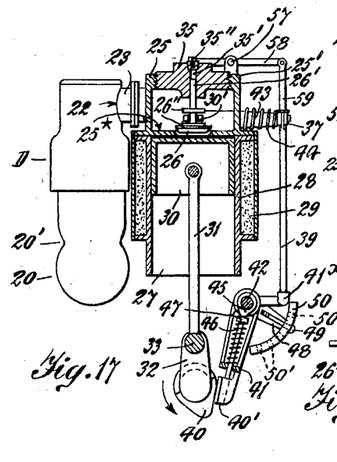
Fig. 17 is a section on the line 17—17 of Fig. 14.
Figures 18, 19, 29:
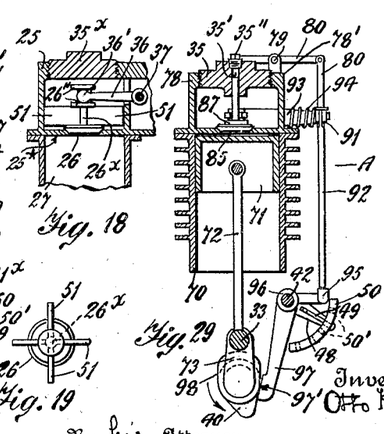
Fig. 18 is a fragmentary sectional view illustrating a modified form of engine admission valve.
Fig. 19 is a detail showing in plan the valve mechanism illustrated in Fig. 18.
Fig. 29 is a section on the line 29—29 of Fig. 14.
Figure 20:
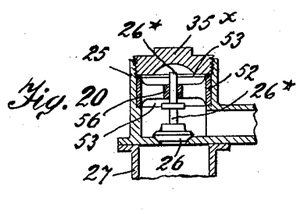
Fig. 20 is a fragmentary sectional view illustrating another modified form of engine admission valve.
Figure 21:
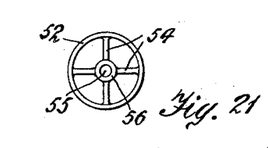
Fig. 21 is a detail showing in plan the valve mechanism illustrated in Fig. 20.

Passing from the steam-generator D through the opening 22 (Fig. 1) in the top of the casing thereof, the working fluid flows through the conduit 23 (Fig. 17) and the foraminated plate 23′ (Figs. 15 and 16) and past the main inlet-valve or throttle-valve 24 (omitted from Fig. 16) into the valve-chest 25, in which are arranged the cylinder admission valves 26 of the engine B provided (in the case herein illustrated) with the two working cylinders 27, the exterior wall 28 of each of which is covered with suitable lagging 29 to prevent radiation of heat from the cylinders 27. Within each of the latter, there reciprocates a piston 30 that is connected, by means of the piston-rod 31 (or 31'), with the cranks 32 which project from the engine or main-shaft 33. Inasmuch as the arrangement of the valves and the operating mechanism therefor are, in the case of each working cylinder 27, the same, a description of such with reference to one of the two working cylinders 27 will here be deemed sufficient. For each working cylinder 27, there are provided one admission-valve 26 and one exhaust-valve 34. In the top of the valve-chest 25, there is screwed, directly above each admission-valve 26, a valve guide-block 35, in which there is formed a vertical guide-passage 35' the outer end of which is closed by a screw-plug 35'' and in which reciprocates the upper part of the valve-stem 26' of the admission-valve 26. At its lower ends, the valve-stem 26' is formed with a pair of collars 26'', between which is fitted the bifurcated end 36' of the valve-operating rocker-arm 36 that is fastened on the inner end of a rock-shaft 37 rotatably mounted in the front wall 25' of the valve-chest 25 (Figs. 14 to 17, both inclusive). The fit of the rocker-arm 36 against the latter wall is gas-tight, whereby leakage of the working-fluid from the valve-chest 25 is avoided. On the outer end of the rock-shaft 37, there is fastened one end of a rocker-arm 38, the other end of which is pivotally connected with the upper end of a valve-operating rod 39, which is actuated by mechanism immediately to be described, as follows, to wit: On the engine-shaft 33, there is mounted fast a cam 40, against which bears a cam-shoe 40' mounted in the free end of a carrier-arm 41 that is forked or V-shaped and the upper ends of the branches 41', 41'', of which are loosely mounted on a cam-carrying rock-shaft 42 so that the carrier-arm 41 is free to swing thereon. The rock-shaft 42 is horizontally disposed and extends in front of both the engine B and the air-compressor A (Fig. 14). From the side or branch 41'' of the carrier-arm 41, there projects forwardly a rocker-arm $41^x$ upon the free end of which is seated the lower end of the valve-operating rod 39. It follows that, when the swell of the cam 40 throws the lower or free end of the carrier-arm 41 to the front (that is, to the right, in Fig. 17), the free end of the rocker-arm $41^x$ is thrown up, whereby the upright valve-operating rod 39 and the rocker-arm 36, 38 are raised and the engine-cylinder admission-valve 26 is opened. From the front wall 25' of the valve-chest 25 (Fig. 15), there projects a pair of lugs or knobs 43, around each of which there is wound a helical spring 44 and through each of which there projects the rock-shaft 37. The outer end of the spring 44 bears against the rocker-arm 38 mounted on the outer end of the rock-shaft 37, so that the tension of the spring 44 tends to throw down the rocker-arms 38, 36, and thereby to close the engine-cylinder admission-valve 26. Furthermore, the tension of the spring 44 tends to force the valve-operating rod 39 downwardly and to keep the cam-shoe 40' pressed against the cam 40 yieldingly. The shaft 42 is a rock-shaft, and, upon the same, there is mounted fast a cam 45, against the face of which there is pressed, by the helical spring 46, the upper end of a rod 47, to the lower end of which is attached the cam-shoe 40'. The position of the latter with relation to the cam 40 may be adjusted by seizing the crank 48 that is fast on one end of the rock-shaft 42 (Fig. 14) and turning the same, whereby the position of the cam-shoe 40' may be varied with relation to the rock-shaft 42 and the time that the inlet-valve 26 is held open is changed, thus providing a variable cut-off. The crank 48 is retained in its adjusted position by the engagement of the free end of a leaf-spring 49 in one of a series of recesses 50' formed in a fixed arcuate plate 50 (Figs. 14 and 17). When the cam-shaft 42 is turned, the two cams 45 thereon turn with it, whereby the positions of the cam-shoes 40' may be adjusted at will, as has just been explained. A modified form of cylinder admission-valve is shown in Figs. 18 and 19, wherein the valve-stem $26^x$ carries four guide-arms 51 that radiate therefrom and the outer ends of which are arranged to slide over the inner wall of the valve-chest 25, as the admission-valve 26 is opened and closed. In this form of the valve mechanism, the block $35^x$ is imperforate and devoid of any guide-channel for the valve-stem $26^x$ and serves merely as a screw-cap or plug to close the opening in the top of the valve-chest 25 above the admission-valve 26. Compared with the construction illustrated in Figs. 18 and 19, the valve-mechanism shown in Fig. 17 is relatively inconvenient or difficult to assemble; for, the accurate seating of the valve 26 and alinement of the valve-stem 26' is sometimes difficult of accomplishment, in view of the fact that the guide-block 35, when being screwed home, hides from sight the parts of the valve mechanism below it, and, furthermore, not being integral with the valve-chest wall 25, may possibly be out of alinement with the valve-seat $25^*$. On the other hand, the valve mechanism shown in Figs. 18 and 19 may be accurately adjusted before screwing home the plug or block $35^x$, and this operation cannot disturb the adjustment of the valve. Moreover, the latter may be readily inspected by merely removing the plug $35^x$, the removal of which involves no risk of disturbing the adjustment of the valve mechanism underneath it. Moreover, the valve-seat $25^*$ and housing 25 that guides the valve-stem $26^x$ are integral with each other and, therefore, cannot change their relative positions with respect to each other. In Figs. 20 and 21, there is illustrated another modified form of valve mechanism, of which the valve-stem guide is constructed as follows: Within a circular band ring or short tube 52, there are mounted, integral therewith, (Fig. 21) radial arms 54, in the central junction-box or hub 56 of which there is formed a guide-opening 55. The ring 52 is fitted snugly within the valve-casing 25 and the valve-stem 26* passes slidably through the guide-opening 55 formed in the central junction-box 56 of the arms 54. The opening in the top of the valve-housing 25, is closed by the imperforate screw-plug 35×, and, between the latter and the top of the ring 52, there is interposed a gasket 53 that prevents the leakage of gas.

The engine exhaust-valve 34 (Figs. 14 to 16 and 22) is held closed upon its seat 34' by the tension of the helical spring 34'' that is wound around the valve-stem 34× and one end of which bears against the top of the valve-chest 25, while its other end presses against the collar 34* mounted on the valve-stem 34×. The exhaust-valve 34 is opened, against the tension of the helical spring 34'', by valve-operating mechanism that may be described in the following way: Fulcrumed at 57, on the top of the valve-box 25, there is a valve-lever 58, one end of which is pivotally connected with the top of the valve-stem 34× and the other end of which is pivotally fastened to the upper end of the upright valve-operating rod 59, the lower end of which rests upon the outer or free end of a rocker-arm 60 that projects from a box or hub 61 through which extends slidingly the rock-shaft 42 and from which extends another rocker-arm 62, the lower or free end of which is formed with a cam-shoe 62' that is held yieldingly, by the helical spring 34'', against the face of the cam 63 mounted fast upon the engine-shaft 33. The hub 61 is idly mounted on the shaft 42, which may, therefore, be rocked without altering the positions of the arms 60, 62, which are substantially the arms of what is practically a bell-crank lever.

Figure 24:
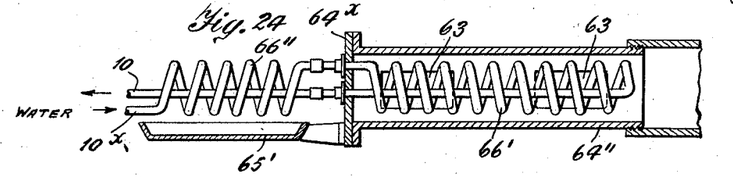
Fig. 24 is a central longitudinal vertical section through a modified form of water-preheater into which the exhaust gases are discharged.
Figures 25, 26, 32:
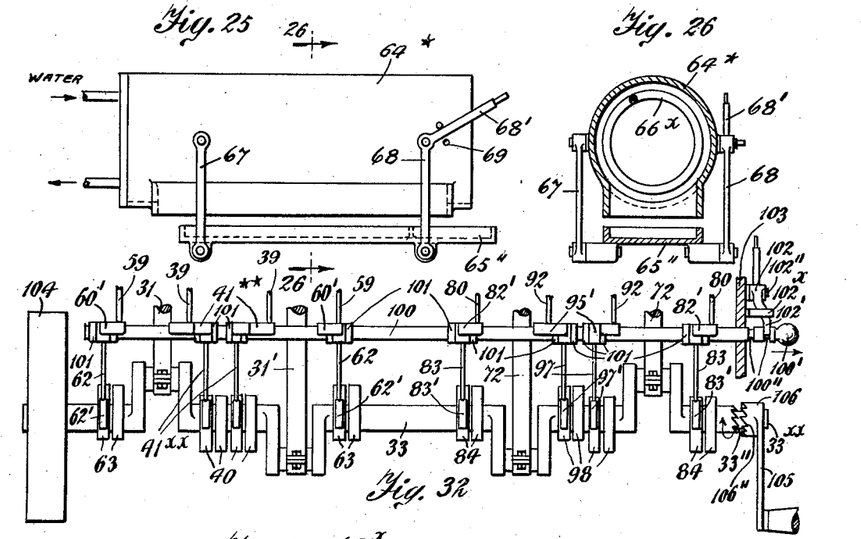
Fig. 25 is an elevation of another modified form of water-preheater.
Fig. 26 is a transverse vertical section on the line 26—26 of Fig. 25.
Fig. 32 is a detail showing a crank-shaft equipped with mechanism for reversing its direction of rotation.

The heat of the exhaust gases is utilized in preheating the water supplied to the steam-generator D and, to effect this preheating, the hereinafter-described arrangement of parts (see Figs. 15 and 23) is provided, to wit: The exhaust gases flowing past the valves 34 are led, by the conduits 63, from the engine B and are discharged into the water-preheater 64, lengthwise of which there extends therein a centrally-disposed cylindrical receptacle 65 for oil, which is closed at one end and around which there is wound a coil 66 of water-pipe, the inlet end 10'' of which leads from a force-pump (not shown) and the outlet end of which is connected with the water-pipe 10 hereinbefore mentioned (see Fig. 1). One end of the water-preheater 64 is open to the atmosphere to permit the discharge thereinto of the exhaust gases, while the other end of the water-preheater is closed by an end-cover 64' (Fig. 23), which partially closes the open end of the oil-receptacle 65. In order to preheat the water at starting, oil is burned in the receptacle 65. Another form of water-preheater is shown in Fig. 24, wherein the oil-receptacle 65 is omitted but there is mounted, in the water-preheater 64'', a coil 66' of water-pipe, as before; one end of the water-preheater 64'' is closed by an end-cover 64×, from which there is supported a pan 65'. Above the latter, the water-pipe 10× leading from the force-pump (not shown) is wound helically around the water-pipe 10, so as to form a coil 66''. When the apparatus is started, oil is burned in the pan or trough 65'; and the flame from the burning oil heats the water flowing through the coil 66'' and the pipe 10. Still another form of water-preheater is illustrated in Figs. 25 and 26, wherein there is shown suspended from the preheater 64*, by means of the link-arms 67 and knee-lever 68, a pan 65'', which, in the normal operation of the preheater, forms the bottom thereof. When the apparatus is started, the operator disengages the branch or arm 68' of the knee-lever 68 from the stop 69, whereupon the pan 65'' will, by its own weight, fall away from the preheater 64* and will then hang suspended therefrom, in the position shown in Figs. 25 and 26. Oil is then burned in the pan 65''; and, when the engine B is about to start running normally, the operator throws down the handle-end of the arm 68' of the knee-lever 68, whereby the pan 65'' is swung up against the preheater 64* and serves as the bottom thereof. As in the case of the structure illustrated in Figs. 15 and 24, the preheater 64* contains a coil 66× of water-pipe and receives the exhaust gases discharged from the engine B, which gases flow over the coil 66× and heat the water flowing therethrough.

Like the engine B, the air-compressor A is provided with two working cylinders 70 (Fig. 14 and Figs. 27 to 29, both inclusive), in each of which there reciprocates a piston 71 connected to the engine shaft 33 by means of a pair of cranks 73 and a piston-rod 72. The valve-mechanism that controls the inflow and outflow of the air to and from the two compression cylinders 70 is substantially the same in the case of each of these two cylinders; therefore, a description of the valve-mechanism of one of the latter will suffice and hereinafter immediately follows. The air-inlet valve 74 and the mechanism for operating the same closely resemble the engine-exhaust valve 34 and its operating mechanism, as will more fully appear from an inspection of Figs. 22 and 27 and the following brief description. The air-inlet valve 74 is held closed against its seat 74' by a helical spring 75 that is wound around the valve-stem 76, the upper end of which is pivotally connected with one end of a horizontally-disposed valve-lever 77, which is fulcrumed at 79 on the valve-casing 78 and the other end of which is pivotally fastened to the upper end of an upright valve-operating rod 80. Idle on the rock-shaft 42, there is a hub or box 81 from which projects horizontally forward an arm 82, in the outer free end of which is seated the lower end of the valve-operating rod 80. From the same hub 81, there extends downwardly and inwardly another arm 83, the lower free end of which is formed with a cam-shoe 83' which is held yieldingly against the face of the cam 84 on the engine-shaft 33 by the tension of the inlet-valve spring 75. When the swell of the cam 84 pushes the cam-shoe 83' outwardly, the valve-operating rod 80 is raised and the air-inlet valve 74 is, against the tension of the spring 75, pushed downwardly away from its seat 74'. The air-outlet valve 85 is illustrated, together with its valve-operating mechanism, in Figs. 14, 28, and 29, from an inspection of which (particularly of Fig. 28), it will be noted that an important difference resides in the omission of the upper one of the pair of collars 26'' that are found on the valve-stem 26' of the engine-cylinder admission-valve 26 (Figs. 16 and 17). It will be at once obvious to all persons skilled in this art that the air-outlet valve 85 is forced open by the pressure of the air in the compressor-cylinder 70, which pressure tends, as the piston 71 advances, to increase, until the outlet-valve 85 opens; and it is, therefore, necessary only to raise the rocker-arm 86 from the collar 87 on the valve-stem 88, so as to permit the outlet-valve 85 to open (see right-hand side of Fig. 28). The means for guiding the valve-stem 88 are substantially the same as those employed for guiding the valve-stem 26' of the engine-cylinder admission-valve 26 and the modified forms of such guiding means (shown in Figs. 18 to 21) may be used equally well for guiding the valve-stem 88. The mechanism for actuating (e. g., closing) the air-outlet valve 85 closely resembles the mechanism for actuating the valve 26 and may be described as follows (Figs. 14 to 17): In the front wall 78' of the valve-chest 78, there is mounted a rock-shaft 90, on the inner end of which there is fastened the rocker-arm 86 and on the outer end of which there is secured the rocker-arm 91, the free end of which is pivotally fastened to the upper end of an upright valve-operating rod 92. Around the projecting tubular trunnion or box 93 (Fig. 29) through which the rock-shaft 90 extends, there is wound a helical spring 94 one end of which bears upon the rocker-arm 91 and tends to press downwardly the upright rod 92, the lower end of which is seated upon the outer free end of an arm 95 that projects forwardly from the hub 96 that is loosely mounted on the rock-shaft 42. Another arm 97 projects downwardly and inwardly from the same hub 96 and its lower end, which is formed with a cam-shoe 97', is pressed, by the tension of the helical spring 94, against the face of a cam 98 fast upon the engine-shaft 33. The arms 95, 97, are, practically, arms of a bell-crank lever. When the swell of the cam 98 throws out the toe 97' of the arm 97, the rod 92 is raised against the tension of the spring 94 and causes the elevation of inner rocker-arm 86 (see the right-hand side of Fig. 28), whereby the air-outlet valve 85 is released so that it may be forced open by the increasing pressure of the air in the cylinder 70, as the piston 71 advances. As the cam 98 continues to turn with the engine-shaft 33, the tension of the spring 94 is permitted to force the rocker-arm 86 downwardly, whereby the air-outlet valve 85 is closed. (See the left-hand side of Fig. 28). The inner rocker-arm 86 is raised from off the collar 87 a substantial period of time before the air outlet-valve 85 is opened; the opening of the latter valve is entirely automatic and the time of its opening depends upon the pressure at which the engine is working at the time. The closing of the air outlet-valve 85 occurs always when the piston 71 is at its uppermost position or the end of its upward stroke and is mechanically effected.

Figure 22:
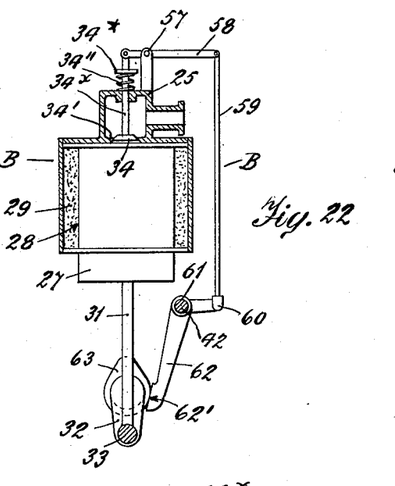
Fig. 22 illustrates an engine exhaust valve and its operating mechanism.
Figure 27:
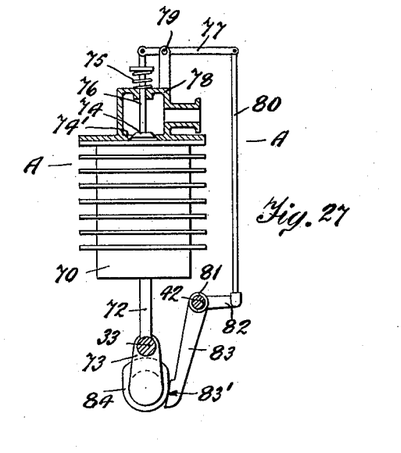
Fig. 27 illustrates the inlet-valve mechanism of the air-compressor and the means by which that mechanism is actuated.
Figure 28:
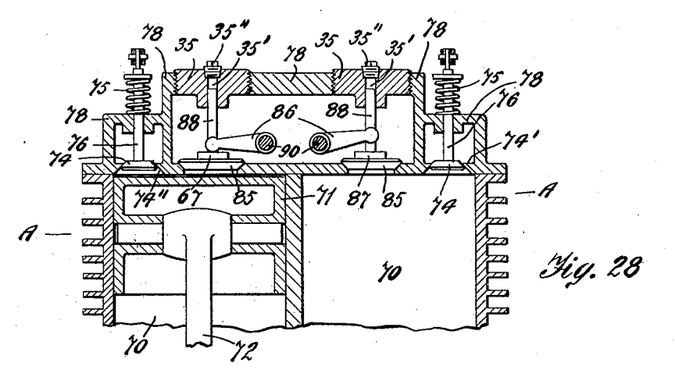
Fig. 28 is a central vertical section through the valve mechanism of the air-compressor.
Figure 30:
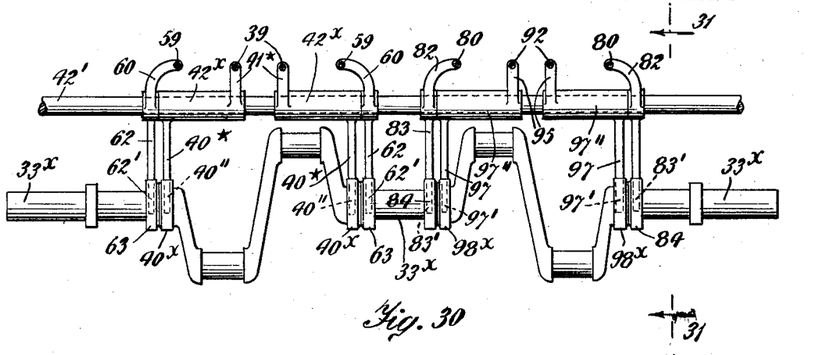
Fig. 30 is a detail illustrating an arrangement of valve-operating cams on a crank-shaft of a standard type.
Figure 31:
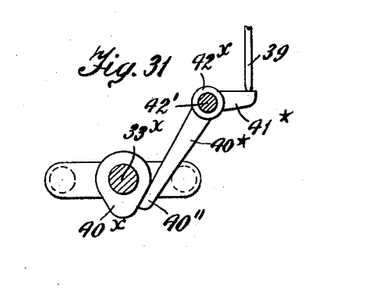
Fig. 31 is a section on the line 31—31 of Fig. 30.

In Figs. 30 and 31, there is shown a modified arrangement of the valve-operating cams 40×, 98×, due to the employment of an engine-shaft 33× of a standard type. Instead of being arranged closely adjacent to each other (as shown in Fig. 14), the cams that control the mechanism for operating the admission-valve 26 are, in Fig. 30 (wherein such cams are marked 40×), placed so that each cam 40× is seated closely adjacent to one of the cams 63 that control the mechanism which regulates the opening and closing of the exhaust valve 34 (Fig. 22.) The cam-shoe 40'' formed on the lower free end of the rocker-arm 40* bears against the cam surface of the cam 40×. The upper end of the rocker-arm 40* is fixedly connected with one end of the hollow rock-shaft or sleeve 42× which is mounted on the shaft 42' and from the other end of which projects the rocker-arm 41*, whereon rests the valve-operating rod 39. As the cam-shoe 40'' rubs over the surface of the cam 40×, the rocker-arm 40* swings back and forth and rocks the sleeve 42×, whereby the rocker-arm 41* is moved alternately down and up to open and close the inlet-valve 26 (Fig. 17.) In a manner entirely similar, each cam 98ˣ, is arranged closely adjacent to one of the cams 84 that control the air-inlet valves 74 (Fig. 27.) The rocker-arm 97 is, at its upper end, fixedly connected with one end of the sleeve 97″ from the other end of which projects a rocker-arm 95′ upon which rests the lower end of the valve-operating rod 92. By the arrangement of parts just described, the connecting-rods 31, 31′, can be placed more closely together than is the case illustrated in Fig. 14.

In Fig. 32, there is illustrated a reversing mechanism by means of which the direction of rotation of the engine-shaft 33 may be changed. Here each of the cams 63, 40, 84 and 98, is replaced by a pair of cams; and the swell portions of the cams of each pair are separated from each other by half a turn or one hundred and eighty degrees. The rocker-arms 62, 83, 97, are idly mounted, at their upper ends, on the reversing shaft 100, between pairs of collars 101 fast upon the latter, so that, when the shaft 100 is moved lengthwise (or laterally of the engine), these rocker-arms 62, 83, 97, will be shifted sidewise and will carry their respective cam-shoes 62′, 83′, 97′, from, say, the left-hand one of the several pairs of cams 63, 84, 98, to the right-hand one thereof. At the same time, the rocker-arms 60′, 82′, 95′, upon which rest, respectively, the valve-operating rods 59, 80, 92, are carried in the same direction; and to insure that the latter will be maintained in position at all times, despite the shifting of their supporting rocker-arms 60′, 82′, 95′, these rocker-arms are made of a greater length than that of the corresponding rocker-arms 60, 82, 95, of the apparatus illustrated in Fig. 14. In an entirely analogous manner, the rocker-arms 41ˣˣ, which carry the cam-shoes 40′, are idly mounted on the reversing shaft 100 between pairs of collars 101 and are, by moving the latter shaft lengthwise, thrown sidewise, whereby the cam-shoes 40′ are shifted to the cams 40 that lie immediately adjacent to the cams upon which they had theretofore rested. The length of the rocker-arms 41** is, for the reason just given in describing the rocker-arms 60′, 82′, 95′, greater than the length of the rocker-arms 41ˣ (Fig. 14). To facilitate manipulation of the reversing-shaft 100, it is formed at one end, with a knob 100′. The reversing-shaft 100 is furthermore formed with a pair of circumferential grooves or channels 100″ adapted to receive the toe 102′ of the spring-controlled locking-lever 102 that is fulcrumed at 102″ on the side of the engine-frame 103. A stop 102ˣ mounted on the latter serves to limit the releasing throw or travel of the toe 102′.

On one end of the engine-shaft 33 (Figs. 14 and 32), there is mounted a fly-wheel 104; and, at its other end, the engine-shaft 33 is formed with a series of ratchet-teeth 33″ and with a reduced portion 33ˣˣ which extends in prolongation of the shaft 33 and upon which is loosely mounted a crank 105 the hub 106 of which is formed with ratchet-teeth 106″ that are adapted to be thrown into and out of engagement with the ratchet-teeth 33″ formed on one end of the engine-shaft 33. By throwing the teeth 33″, 106″, into mesh, and turning the crank 105 in the direction of the arrow shown in Fig. 14, the engine-shaft 33 may be manually rotated, as in starting the engine; but it is obvious that the engine cannot be started by hand, in a direction opposite to that indicated by the arrow at the right of Fig. 32, by the means just described. However, at any time that the engine-shaft 33 is at rest, the fly-wheel 104 may be grasped by the hands and the engine-shaft turned in either direction.

I claim:

1. An oil-burning furnace including a combustion chamber; a flue that extends downwardly therefrom; and a drum into which the flue projects and which is formed with holes in its upper end above the mouth of the flue, said holes permitting the escape of the products of combustion from the drum.

2. A furnace for the combustion of oil, said furnace including a flue for the passage of the products of combustion; a casing within which said flue is mounted; a water-conduit mounted in said flue; and a drum which is mounted in the lower part of said casing, and into which said flue extends and which is formed with openings for the passage of the products of combustion flowing from said flue and drum into the space between the same and the casing; the lower portion of said drum being formed with outlets permitting the flow of water from the water-conduit into the lower end of the casing.

3. A furnace for the combustion of oil, said furnace including a flue for the passage of the products of combustion; a casing within which said flue is mounted; a water-conduit mounted in said flue; and a drum into which said flue extends and which is formed with openings for the passage of the products of combustion flowing from said flue and drum into the space between the same and the casing; said drum being formed, at its lower end, with a nipple which is seated in the lower portion of said casing and is formed with outlets permitting the flow of water from the water-conduit into the lower portion of said casing.

4. A furnace for the combustion of oil, said furnace including a combustion chamber; a flue through which pass the products of combustion therefrom; and a water-conduit which extends within said flue; the wall of said combustion chamber being formed with a cleaning-hole above the inlet-end of said water-conduit.

5. A power-plant including an oil-burning furnace having a combustion-chamber; a flue through which the products of combustion pass therefrom; and a steam-generator in which the flue is mounted and which is formed with a bulbous-shaped wall that directs the products of combustion inwardly toward the flue.

6. A power-plant including an oil-burning furnace having a combustion-chamber; a flue through which the products of combustion pass therefrom; and a steam-generator in which the flue is mounted and which is formed with a plurality of bulbous-shaped portions arranged above each other and which direct the products of combustion inwardly toward the flue.

7. In an apparatus of the character described, a steam-generator; a flue which is mounted therein and through which pass the products of combustion; a drum into which said flue projects and which is seated in the lower end of said steam-generator; and a water-conduit which extends through said flue and the outlet end of which is fitted in the lower part of said drum.

8. Means for preheating water, including a casing into which exhaust gases are discharged and which is provided with a receptacle for holding a combustible; and a water-pipe which is arranged to be exposed to the heating action of the exhaust gases passing into the casing and to the preheating action of the products of combustion of the combustible held in the receptacle.

9. Means for preheating water, including a casing into which exhaust gases are discharged and which is provided with a movable receptacle for holding a combustible; a water-pipe which is arranged to be exposed to the heating action of the exhaust gases passing into the casing and to the preheating action of the products of combustion of the combustible held in the receptacle; and mechanism for moving the receptacle to and from the casing.

10. An oil-burning furnace including a combustion-chamber; a valve-controlled conduit for leading air thereto; an oil-atomizer for spraying oil thereinto; and a mouthpiece which is mounted in the combustion-chamber and through which the sprayed oil passes thereinto; the edge of the discharge-end of the mouthpiece being in part in close contact with the wall of the combustion-chamber and in part separated therefrom by a narrow interval through which the air issues and mingles with the sprayed oil flowing from the mouthpiece.

Signed at Chicago, Illinois, this thirteenth day of March, 1918, in the presence of the two undersigned witnesses.

OTTO KRAUS.

Witnesses:
 ELSIE MARTIN,
 S. C. DUNN.